United States Patent
Smith et al.

(10) Patent No.: US 7,233,909 B2
(45) Date of Patent: *Jun. 19, 2007

(54) METHOD OF AND APPARATUS FOR FORECASTING ITEM AVAILABILITY

(75) Inventors: Stephen A. Smith, Saratoga, CA (US); Kevin G. Hoar, Portland, OR (US); David B. Callender, San Francisco, CA (US)

(73) Assignee: Storesight Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/350,467

(22) Filed: Feb. 8, 2006

(65) Prior Publication Data

US 2006/0224439 A1   Oct. 5, 2006

Related U.S. Application Data

(63) Continuation of application No. 09/827,531, filed on Apr. 6, 2001, now Pat. No. 7,027,999.

(51) Int. Cl.
*G06F 17/60* (2006.01)
(52) U.S. Cl. ........................................ 705/10
(58) Field of Classification Search ............... 705/10
See application file for complete search history.

(56) References Cited

U.S. PATENT DOCUMENTS

2003/0074349 A1 *   4/2003   Gupta et al. ................... 707/3

FOREIGN PATENT DOCUMENTS

WO          WO 9530201 A1 *  11/1995

OTHER PUBLICATIONS

Crowley, Sam. "CompUSA Announces 'Click and Brick' Shopping Enhancements;—Online Product Pricing and Availability Information to Aid Last-Minute Holiday Shoppers". PR Newswire. Dec. 21, 1999.*

* cited by examiner

*Primary Examiner*—Catherine M. Tarae
*Assistant Examiner*—Peter H. Choi
(74) *Attorney, Agent, or Firm*—Sterne, Kessler, Goldstein & Fox PLLC

(57) ABSTRACT

A method and apparatus is described for determining the probability that an item will be available at a particular location at an expected time of transaction for the item. Variances for both reported and unreported sales rates of the item may be calculated. Probability distributions may be generated for these sales rates and a convolution performed to obtain the probability that the item will be available at the expected time of transaction.

3 Claims, 8 Drawing Sheets

METHOD OF AND APPARATUS FOR FORECASTING ITEM AVAILABILITY

FIELD OF THE INVENTION

This is a continuation of application Ser. No. 09/827,531, filed Apr. 6, 2001 now U.S. Pat. No. 7,027,999, which is incorporated herein by reference in its entirety. This invention relates to the field of forecasting and, in particular, to the generation and delivery of forecasted information through a network.

BACKGROUND

Mass adoption of the Internet by both consumers and businesses has resulted in the use of the Internet for product advertising and research. For example, a manufacturer or a retailer may rely on its on-line site to inform consumers of the products it has for sale. Every day upwards of 20 million people research products on-line before buying them off-line. A consumer may visit a product manufacturer's Web site to evaluate features and functions of different products and possibly compare them to products offered by competing manufacturers.

Even with the advent of on-line research, it has been observed that many consumers still limit their use of the Internet for product research and visit "brick and mortar" stores to make their product purchases. An important factor that consumers consider in deciding whether to act on this product research and purchase a particular product is the availability of an item for sale at a brick and mortar location near them. The consumers who research online and then buy off-line represent upwards of $1 trillion in purchasing power and are more likely to buy in stores, which are likely to have the item in stock. Given that consumers can actually develop a focused, well-informed product preference before ever visiting a store, if a retailer's brick and mortar store is unlikely to have an advertised product in stock, a consumer would probably not choose to go to that particular store to purchase the desired product.

As such, consumers have an interest to know whether a store will have an item in stock at the time they wish to purchase a product. However, there is no retailing structure around this behavioral pattern beyond that of a consumer telephoning or actually visiting individual stores that he knows of in the area to determine if those stores have a desired product in stock. In addition, if a store will not set aside a product for a consumer, there is no way for a consumer to predict whether the product will still be available for purchase when the consumer actually visits the store.

Currently, retailers utilize batch processing of sales data to forecast their need to replenish product inventories. Retailers may have multiple brick and mortar stores that each may have multiple cash registers. At end of the day, the sales data from all cash registers of a particular store are transferred to an inventory computer that compiles and stores all the data. The sales data from each store's inventory computer is then uploaded to a corporate inventory server that collects the sales data from all of a retailer's stores. As such, when a purchase is made early in the morning, a retailer's corporate inventory server may not obtain the sales data for that purchase until much after the close of business. Although, some retailers are slowly migrating to systems where individual stores are uploading sales data soon after a purchase transaction is conducted, neither of these types of inventory processing systems provide product availability information to consumers, much less on an industry-wide basis.

In addition, customers may choose to visit the retail store some time after researching the product on line. During this time period, other customers will arrive randomly at the store and some may purchase the same item, thus reducing the retailer's inventory. A customer who checks the current on line availability has no means of forecasting the likelihood that the desired product will be purchased by another customer during this time period.

Finally, retail inventory records are often highly inaccurate. A recent empirical study conducted by faculty at the Harvard Business School found that only approximately ⅓ of the retail store inventory data records were actually correct. (Ananth Raman and Nicole deHoratius, "Inventory Record Inacccuracy: An Empirical Study," Harvard Business School.) That is, theft, damage and misplaced items create "unreported demands" that reduce the retailer's inventory below what is indicated by the inventory records. Potential customers have no information regarding this unreported demand and no way to account for it in their decision making.

SUMMARY OF THE INVENTION

The present invention pertains to a method of and apparatus for determining item availability, where availability is defined as the likelihood that the desired item will be in stock when the customer chooses to purchase it. In one embodiment, the method may include calculating a first variance for a reported sales rate of an item and calculating a second variance for an unreported sales rate of the item. The method may also include generating a first probability distribution for reported sales, during a delay time, of the item and generating a second probability distribution for unreported sales of the item based on an update time of a ready to sell parameter. The method may also include performing a convolution of the first and second probability distributions to obtain a probability of an availability of the item at an expected time of transaction.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

Figure 1:
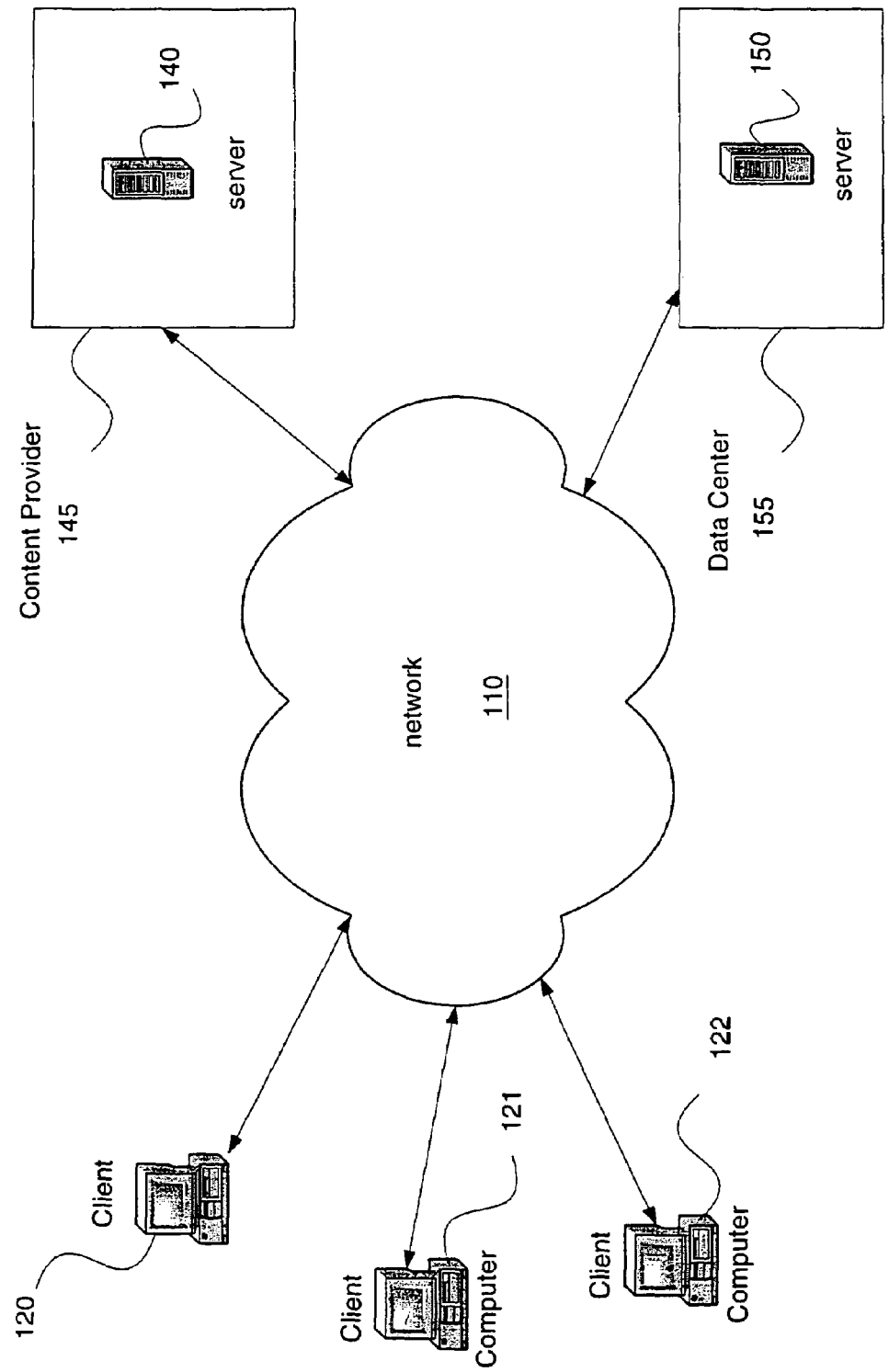
FIG. 1 illustrates one embodiment of a network system used in determining the availability of an item.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may includes, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

The present invention may also be practiced in distributed computing environments where the machine readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A method and apparatus for determining the probability of an item's availability, at a given time, at a particular source for the item is described. In one embodiment, the method and apparatus is described in relation to determining the probability that a consumer will find a particular product in stock at a particular store location at the time when the consumer makes a trip to the store.

For example, a consumer may visit a network site such as CNET to do their "what-to-buy" product research (e.g., comparing the features/functions of a digital music player). While still on CNET's site, the consumer may be able to enter a geographic designation, such as their zip code, in a data entry field on the page and press a submit button. The consumer may also input a desired quantity and an estimated time when the consumer will visit the store to make the purchase. The estimated time of purchase may also be a criteria to determine product availability. The quantity and time of purchase may be derived in other ways, for example, predicted or fed by a network site as a hidden form field.

The scheme described herein may aggregate various "raw" data from retailers (e.g., store locations, product codes, inventory information, sales history data) for performing a probability analysis. A product availability engine may be used to calculate and display store-level, in-stock info. For example, a list of retailers within a certain geographic area (e.g., 10 miles of that zip code) that will have particular models of a digital music player in-stock at the estimated time of purchase (e.g., that day) may be displayed to the consumer. The number of available units at each retailer's location may also be displayed.

In an alternative embodiment, the store, quantity, and/or time of purchase may be a variable parameter displayed to the user corresponding to a particular displayed result. If a consumer merely enters or selects a particular product, then a list of retailers carrying the particular product may be displayed to the consumer along with the number of units in-stock at each time increment. For example, retailer A has a 90% probability of having 2 units in stock today at location X and an 80% probability of having 1 unit in stock tomorrow at location Y.

In one embodiment, upon selecting a specific store (e.g., the Best Buy store in San Carlos, Calif.), a consumer may be provided with a map or directions to the store. In another embodiment, the consumer may be offered related items and accessories for the desired product that are also in-stock at that particular store.

It should be noted, however, that the method and apparatus is not limited to in-stock probability determinations for the availability of an item for sale. In an alternative embodiment, probability determinations may be performed for the availability of other items (e.g., services) for other types of transactions (e.g., lease, barter, and other forms of commercialization). In one embodiment, for example, a probability determination of the availability of a hotel room for rent at a particular time may be performed. Other examples of items for availability determinations include, rental cars, tickets for entertainment events, appointment times for services (e.g., haircut).

In addition, the method and apparatus discussed herein is not limited to in-stock probability determinations for physical "brick & mortar" store locations. In an alternative embodiment, item availability determinations may be performed for on-line retailers such as Amazon.com.

FIG. 1 illustrates one embodiment of a network of systems used in determining the availability of an item. Network 110 may be described in a simplified manner as a collection of public/private networks (e.g., transmission lines, switches, routers, servers, etc.) that interconnect computer systems (e.g., clients and servers) to enable the transfer of information among them. Network 110 may include, for examples, an Internet Protocol (IP) network, a Public Switched Telephone Network (PSTN), a wireless network, and a private branch exchange network (PBX). However, other types of networks may also be included in network 110.

An IP network transmits data in the form of packets that include an address specifying the destination systems for which communication is intended. This data may be transmitted through PSTN copper wire transmission lines or higher bandwidth transmission lines such as ISDN, DSL, frame relay, T1, or fiber physical interfaces. Some companies use intranetworks, such as a PBX, that have these high bandwidth transmission lines.

A wireless system (e.g., cellular and personal communication services) provide analog and/or digital transmission of data in which a user has a wireless connection from a wireless device (e.g., a telephone, a personal digital assistant, a laptop, etc.) to a receiver/transmitter. A wireless networks may provide interactive data services such a web page browsing using various protocols, for example, a wireless application protocol (WAP) to enable wireless phone users to access the interactive data services from screens of the wireless phones. WAP defines an eXtensive Markup Language (XML) syntax called Wireless Markup Language (WML). WML content may be accessed over an IP network using standard HTTP requests. WAP is known in the art; accordingly, a detailed discussion is not provided. Alternatively, other wireless protocols may be used. In one embodiment, the wireless telephony system may be connected to the IP network through a gateway.

As noted above, other types of networks, protocols and delivery methods may be used to deliver data among clients and servers, for examples, HMTL, flat ASCII text, XEDI, and custom formats. In addition, object-oriented systems may be used to facilitate the delivery of data such as CORBA, COM/DCOM/COM+, SOAP, and Visual Basic. In an alternative embodiment, for example, data may be delivered over an Integrated Voice Response (IVR) System using VoiceXML or other means.

The architecture also includes computer systems 120–122, 140 and 150. These computer systems 120–122, 140 and 150 are often modeled by their function: client-server. In the client-server model, communication generally takes the form of a request from the client to the server asking for an operation to be performed (e.g., request for data). The server performs the work and sends a reply. A client may then retrieve and display the requested information. For ease of explanation, computer systems 120–122 are referred to as clients and computer systems 140 and 150 are referred to as servers. However, these computer system may operate as either or both a server and a client.

A consumer may use client 120 to establish a network 110 connection to content provider's server 140 to obtain information regarding a product. Content provider 145 provides web pages on a server 140 that contains product information such as model numbers, product specifications, and pricing. A content provider may be, for examples, a manufacturer of products, a distributor of products, or a facilitator of product information such as CINET or Storerunner.com.

Data center 155 may include a server 150 that determines the in-stock availability of a product based on parameters that may be provided by either client 120 and/or content provider 145. In one embodiment, the content provider 145 and data center 155 may be the same.

It should be noted that three clients 120–122 and two servers 140 and 150 are shown only for illustrative purposes and that the architecture may have more or less than three clients and more than one content provider 145 and data center 155. In addition, the content provider 145 and data center 155 may each include more than one server. Alternatively, content provider 145 and data center 155 may utilize the same server or servers.

The client-server systems may communicate with each other using a variety of network protocols, such as Transmission Control Protocol/Internet Protocol (TCP/IP) and Integrated Packet Exchange (IPX), and a variety of application protocols, such as HyperText Transfer Protocol (HTTP). One or more security layers for managing the security of data transmission may also be used, for example, Secure Sockets Layers (SSL).

A user typically views network 110 as a collection of web pages that are typically located on one or more servers (e.g., server 150 of data center 155). Each web page may contain text, embedded components such as graphic image files, and address links to other pages referred to as a Uniform Resource Locator (URL). Web pages may be viewed using a program called a browser that resides on a user's client computer (e.g., client computer 120). The browser retrieves information from a requested page on a server, interprets the data and formatting commands, and displays the text and special accessory files, such as images, on the user's client system.

Figure 2:
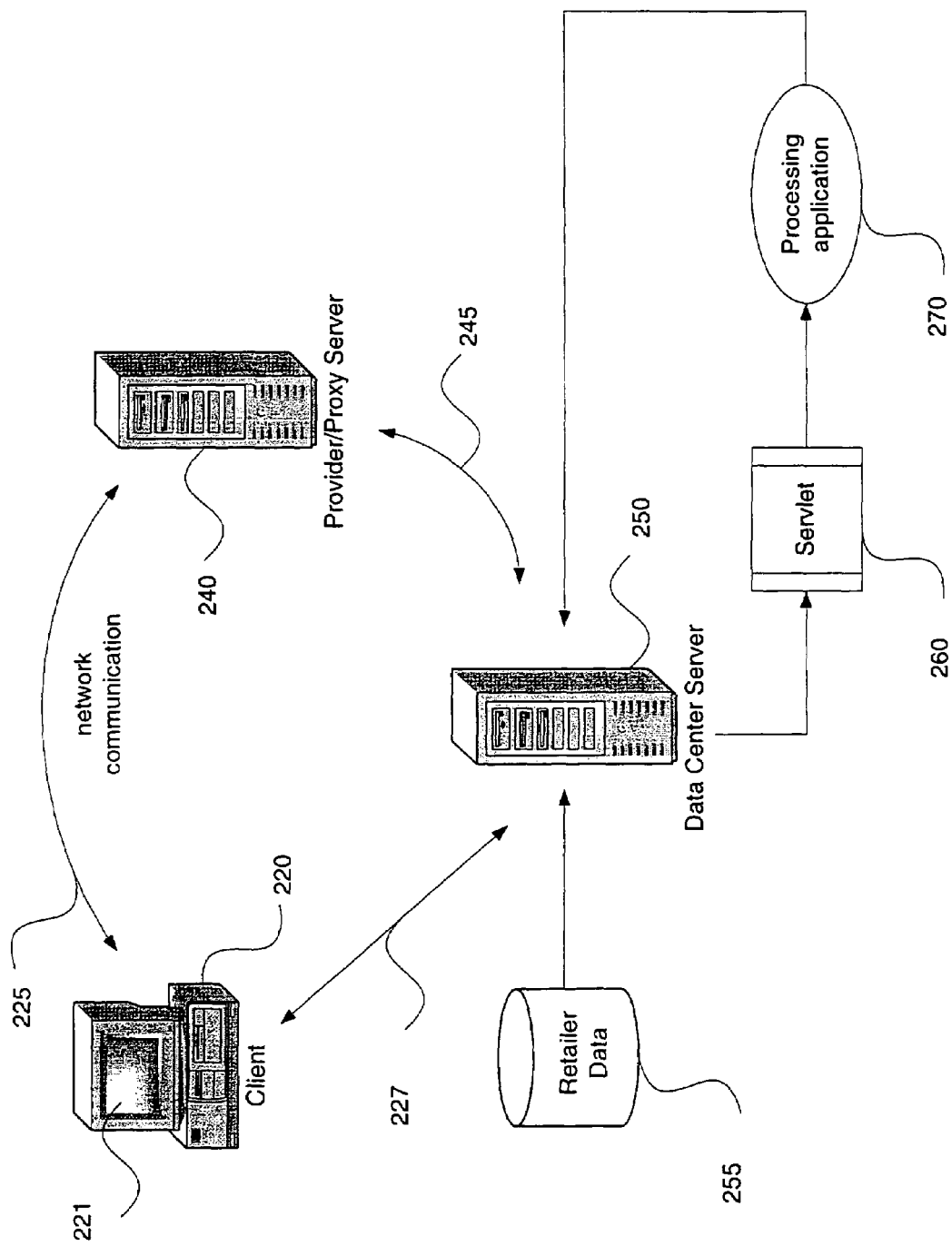
FIG. 2 illustrates one embodiment of client-server interaction in providing indication of in-stock probability.

FIG. 2 illustrates one embodiment of client-server interaction when providing indication of in-stock probability. Data center server 250 and provider server 240 may be servers 150 and 140 of FIG. 1, respectively. In some embodiments, communication between data center server 250 and client 220 can take place via connection 227. In one embodiment, client 220 may be operated by a consumer that seeks information regarding a particular product. Client 220 may establish a network connection 225 for network communication with server 240 to view web pages served by server 240. As discussed above, server 240 may be operated by a portal or a content provider such as a manufacturer or retailer of a product that provides information about a product. Browser 221 of client 220 retrieves information from a requested page on server 240, interprets the data and formatting commands, and displays text and special accessory files, such as images, to the user of client 220. In some embodiments, Server 240 may submit the data 245 to data center server 250, for example, in the manner of a form post over HTTP.

Figure 3A:
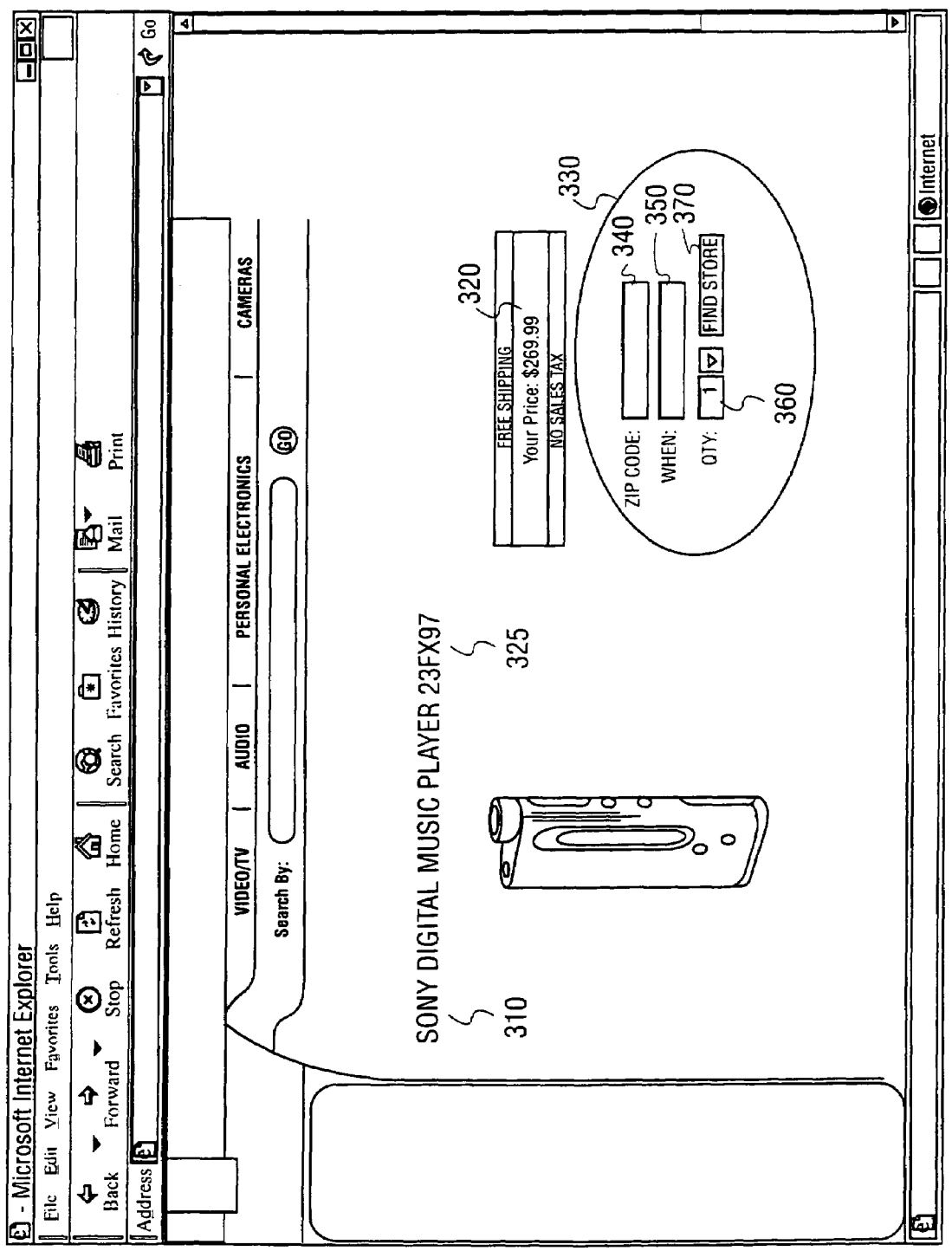
FIG. 3A illustrates one embodiment of a web page query screen displayed to a user.

FIG. 3A illustrates one embodiment of a web page displayed to a user. In one embodiment, a user may request information regarding a specific product 310 (e.g., a digital music player). Server 240 of FIG. 2 returns information about the product to the user. The information may include pricing information 320, a product identifier (PID) for the product 325, etc. In addition to presenting the user with the requested product information, server 240 of FIG. 2 may also request parameter inputs from the user, for example, in the manner of a form 330 to fill-out. Form 330 may include various means of data entry such as data entry fields, radio buttons, check boxes, pull down menus, etc. Web page data entry means are known in the art; accordingly, a detailed discussion is not provided.

Form 330 enables users to provide parameters that may be used to determine the availability of the desired product at particular stores, for example, geographic designation 340, expected time of purchase 350, and quantity of items desired 360 for purchase at the time of purchase. Geographic designation 340 may include, for examples, a zip code and a geocode. A geocode is a geographic location of a particular address using geographic coordinates (e.g., longitude, latitude) and/or Global Positioning System (GPS) like coordinates utilizing an electronic mapping system. In alternative embodiments, for examples, cellular location targeting may be performed using a network or NAM id assigned to a wireless phone or PDA, by triangulating a user's position, or embedding geocoding technology, into the wireless phone or PDA.

In another embodiment, geographic designation information 340 may also include adjacent zip codes, cities, radius within a predetermined number of miles from an address, and radius within a variable number of miles, etc. Time of purchase information 350 may be entered in various time units (e.g., hour, day, week, month, etc.) or, alternatively, may default to an assumed time unit.

The data entered in form 330 may be submitted to server 240 of FIG. 2 in the form of an HTTP form post request, for example, after Submit button 370 is activated by the user. Server 240 may submit 245 the data to data center server 250, for example, in the manner of a form post over HTTP.

In an alternative embodiment, the server 240 may operate as a proxy server and (acting like a client) pass the form post request to data center server 250. The proxy server may be associated with or be part of a gateway server of content provider 245. The proxy server may also operate as a cache server. The functions of proxy and caching can be in separate server programs or combined in a single program. Different server programs may be in different servers. In yet another embodiment, client 220 may communicate direct with server 250 via network connection 227.

Data center server 250 may also contain more than one server. For example, the functions of server may be in the same machine with a firewall server or it may be on a separate server and forward requests through the firewall. Proxy, firewalls, and caching are known in the art; accordingly, a detailed discussion is not provided herein.

In one embodiment, data center server 250 uses a servlet 260 to operate on the form. Servlet 260 may validate the form (e.g., determine that the correct/complete information was received), parse the form, manage the connection to the application. Servlet 260 passes the information to a data processing application 270 residing on data center server 250 that extracts and operates on the parameter information. Servlet 260 may be written with an objected-oriented programming language such as Java. Servlets are known in the art; accordingly, a detailed discussion is not provided. In an alternative embodiment, other types of programs may be used to perform the functions of servlet 260.

A PID (e.g., product identifier 325 of FIG. 3) may be specific to the content provider, a distributor, or the product manufacturer (e.g., a model number). Because different content providers may use different PIDs, these PIDs need to be normalized in order to map different content provider's product identifiers to the corresponding product. As such, the PID is then translated to a normalized identifier. The translation may be performed with a look-up table or other methods known in the art.

In one embodiment, the parameter information may generated by the processing application 270 to supplement user inputted information or fill-in information not provided by the user based on assumed values. For example, if a user enters a particular zip code, processing application 270 may also use adjacent zip codes (whether presented by the user or determined by the application) as a search parameter. As another example, if the user does select or input a time to visit a store, processing application 270 may use a value based on a historical analysis of previous user inputs.

Server 250 may also receive data 255 from a retailer regarding the retailer's sales activities and inventory. This retailer data 255 may be used along with the other parameter information to set up variables used in the computation of an in-stock probability. The retailer data 255 may be updated on a regular basis (e.g., daily) or on an as-desired basis. In one embodiment, retailer data 255 may be uploaded from a retailer's server. In an alternative embodiment, retailer data 255 may be received by other means, for example, manually input into server 250.

Using the parameter information and retailer data, processing application 270 operates to determine the stores that have a desired product (e.g., based on the normalized identifier). Out of that group of stores, the stores having the product within the selected geographic area determined. In an alternative embodiment, the stores having the desired product may be determined after determining which stores are within the selected geographic area. Then, processing application 270 may determine the in-stock probabilities for each store at the desired time of purchase. For example, a determination may be performed that 12 stores are within the selected geographic area. Out of those 12 stores, 10 of them may be determined to have the product. Out of those 10 remaining stores, processing application 270 may determine the probability for each of the 10 stores that the desired product will be in stock at the time the consumers visits the store to make a purchase. The operation of the processing application is discussed in greater detail below.

Figure 3B:
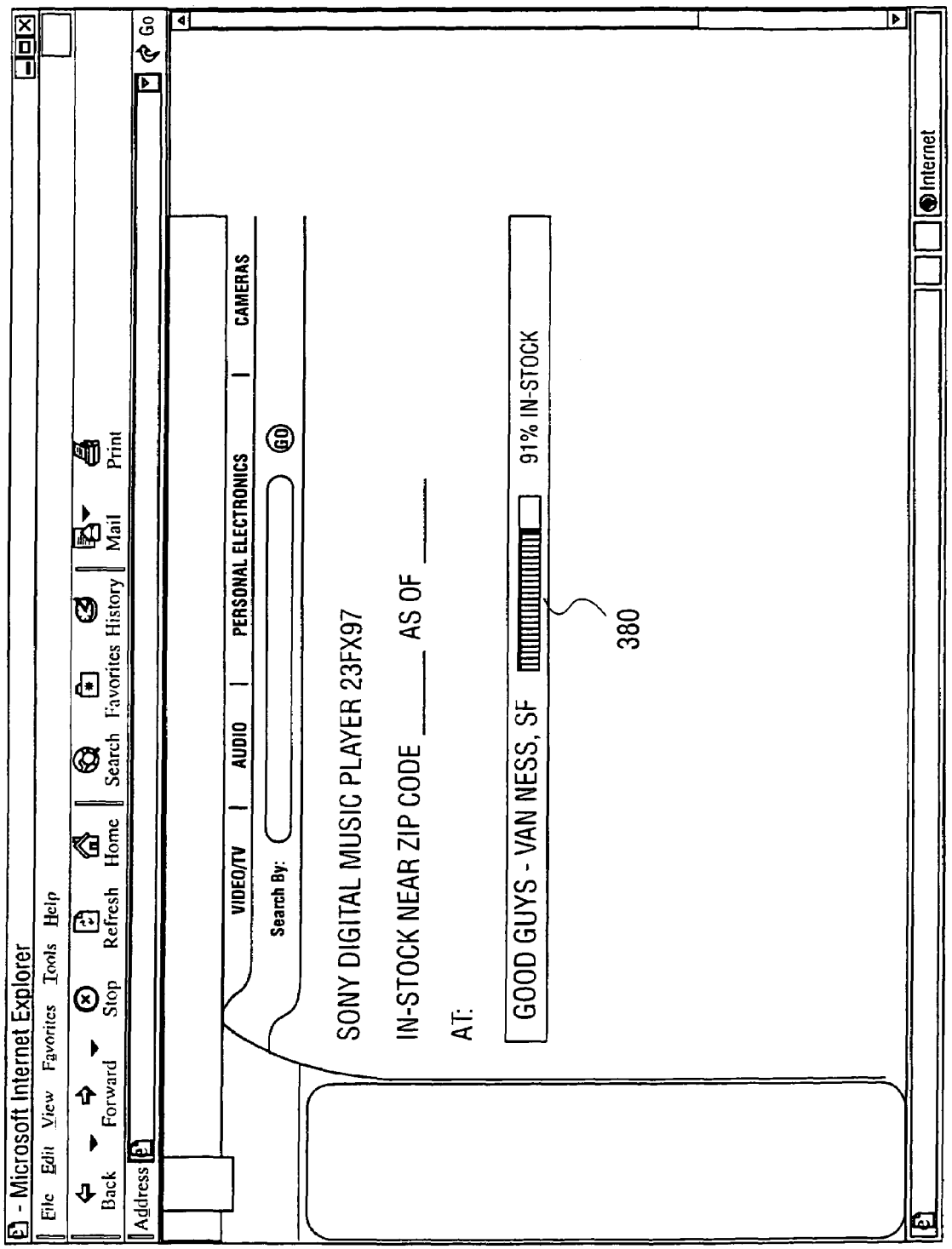
FIG. 3B illustrates one embodiment of web page displaying an in-stock probability.

The probability may be presented to the consumer in various manners. For example, the probability may be visually displayed to the consumer as a percentage chance 380 that the product will be in stock, as illustrated in FIG. 3B. Alternatively, the probability may be presented to the user in other manners (e.g., audibly) and in other forms such as graphically or as an absolute indicator (e.g., in-stock, out-of-stock, call store) or a confidence descriptor (e.g., high, medium, and low). The displayed probability may directly transmitted from data center server 250 to client 220 via connection 227 or, alternatively, through server 240.

In an alternative embodiment, the parameter data that may otherwise be inputted by a user may be assumed or predetermined such that in-stock probability is automatically calculated and displayed to the user after the user inputs a product identifier (e.g., as shown in field 310). For example, the quantity may be assumed to be "1" and the time of purchase may be assumed to be that day. In one embodiment, the in-stock probabilities of the desired item for all stores by zip code (e.g., sorted numerically) may be displayed to the user.

Figure 4:
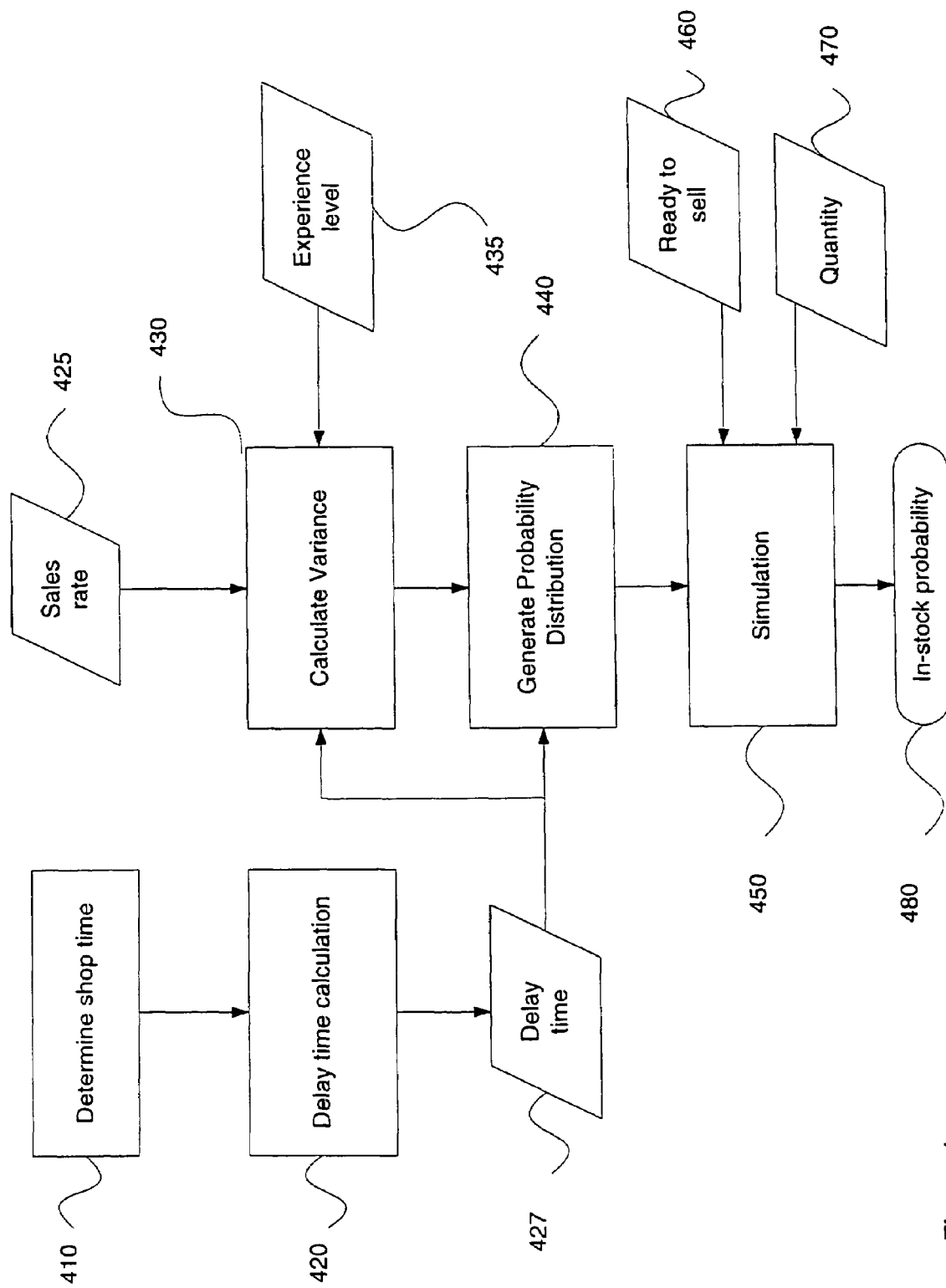
FIG. 4 illustrates one embodiment of a method of determining the in-stock availability of an item.

FIG. 4 illustrates one embodiment of a method of determining the in-stock availability of an item. An expected time of purchase ("shop time") parameter is determined, step 410. The shop time is the number of time increments that is expected to elapse before a customer visits a store to purchase an item. The shop time may be derived from a user input or, alternatively, may be derived by other means, for examples, assumed based on a historical database of inputted values, questionnaire, etc. The shop time is then used to calculate a delay time 427 in step 420. The delay time 427 is the difference between the current time of the in-stock availability determination and the shop time.

Sales rate 425 may be received from a retailer or calculated based on sales data received from a retailer. In one embodiment, the sales rate 425 may be the average projected rate of sale per unit time (e.g., per day or portion of a day) during the delay time. The average rate of sale per unit time may be projected from historical data received from a retailer.

A variance of sales rate 425 may then be calculated, step 430, based on experience level 435 for delay time 427.

Variance is a measure of the dispersion around a mean, given by the arithmetic average of squared deviations. For forecasted values, variance may be used to determine the probability that a particular forecast error occurs. For the sales rate 425, the variance is used to compute the probability or likelihood that the actual sales will exceed the forecasted sales by more than a given amount. For example, if the forecasted sales during the delay time 427 is 5 units and the ready to sell 460 quantity at a particular store is 8 units, the variance may be used to determine the probability that the actual sales will exceed the 8 units during delay time 427. In one embodiment, the variance calculation 430 is based on a retailer's experience level 435 with regard to the accuracy of the ready to sell 460 quantities.

Experience level 435 may be measured statistically by the number of time units of observation for the sales of a particular product. Experience level 435 may be a subjectively assessed level of reliability of a retailer's data. In one embodiment, experience level 435 may be one of multiple predetermined constants that are selected based on the assessed level of reliability of a retailer's data. For example, if a retailer's data is assessed to have a high level of reliability, the experience level may be set to a higher constant than a retailer's data assessed to have a low level of reliability. Based on the particular formula used to calculate variance, the value of the constant in relation to the level of reliability may be the inverse of that given above. In an alternative embodiment, a variance calculation may not be performed. Rather, variance may be assumed to be a multiple of the sales rates.

Based on the variance, a probability distribution may be calculated for sales during the delay time, step 440. The probability distribution reflects all possible values of a retailer's sales of an item, with an estimate of their probabilities. Probability distributions, variances, and convolutions are known in the art, for example, as discussed in "Stochastic Processes," by E. Parzen, Holden-Day Inc., 1962.

A simulation, or expected value calculation, 450 may then determine the expectation of shopping outcomes in order to present an in-stock probability 480 to the consumer based on the parameters that were used. In one embodiment, simulation 450 may be run using a ready to sell parameter 460 and a quantity parameter 470. The simulation 450 combines the probability distribution for the number of units sold during delay time 427 with the probability distribution for ready to sell parameter 460. This determines a single probability that the number of units the customer wishes to purchases will still be available after delay time 427 has elapsed.

The quantity parameter 470 is the number of units of the product desired by the customer. A value for quantity parameter 470 may be derived from a user input or, alternatively, may be an assumed default value such as "1." The ready to sell parameter 460 is the number of units of inventory for a particular product (e.g., a PID or SKU) that are ready to sell in a particular store. The ready to sell parameter 460 may be based on the most recently reported inventory information from a retailer. For example, a retailer's inventory information may be updated on a daily basis.

In an alternative embodiment, other parameters and retailer data may be used to refine the in-stock availability analysis. For example, the in-stock probability analysis may also be based on: the historical seasonal variations in sales patterns throughout a year; the estimated selling rate per day for the product at a particular store at a particular time; the experience or confidence level for the sales rate estimate; the projected rate of unreported sales including merchandise shrinkage and data integrity problems; the units on hand and ready to sell for the product at a given store; and/or the time since the product store inventory information was last updated.

It should also be noted that the retailer data used to calculate the availability of a particular product may be data derived directly from sales of that particular product or data derive from other similar products or sales. For example, if product XYZ has insufficient or no sales history, then the sales history for similar product ABC may be used. Alternatively, the sales history of a non-similar product MNO may be used where product XYZ is anticipated to have a similar sales history to product MNO. For example, product XYZ may be peanut butter and product MNO may be jelly. Although, peanut butter and jelly are different products, their sales history may be anticipated to be similar due to their mutual consumption.

Figure 7:
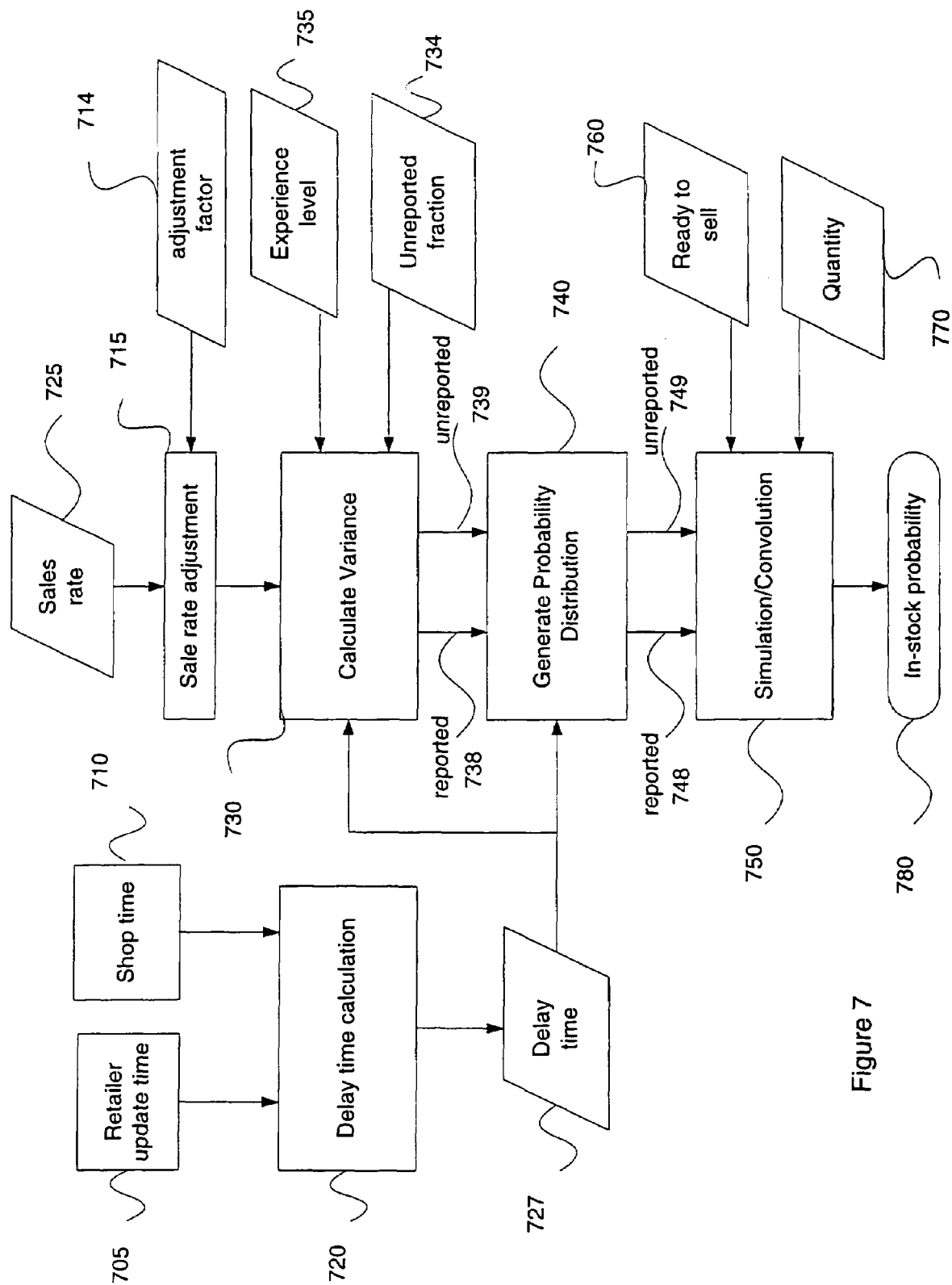
FIG. 7 illustrates an alternative embodiment of a method of determining the in-stock availability of an item.

FIG. 7 illustrates an alternative embodiment of a method of determining the in-stock availability of an item. In one embodiment, the retailer update time 705 may be used in calculating delay time 727. Retailer update time 705 reflects the last time that the retailer updated its inventory data and, therefore, may add to the uncertainty of sales during the delay time period. The retailer update time 705 may be presented as an absolute time or relative to the current time of the in-stock availability determination. The delay time 727 is then calculated, step 720, as the difference between the retailer update time and the shop time. Shop time 710 is the time when the shopping is likely to take place. For example, with the time increment given in days, if the shop time is one day after the current time and the retailer update time is 20 days prior to the current time, then and the delay time is calculated to be 21 days.

In one embodiment, an adjustment to sales rate 725 may also be made, step 715, based on one or more sales adjustment factors 714. For example, sales adjustment factors 714 may include historical seasonal variations in sales patterns throughout a year; the estimated selling rate per day for the product at a particular store at a particular time; and unreported sales fraction 734. The unreported sales fraction 734 is the fraction of sales that are unreported at a particular time. For example, the unreported sales fraction 734 may be an estimate of the unreported sales, shrinkage, and/or data integrity problems since the last physical inventory count and reconcile at a retailer's store.

A variance may then be calculated of the adjusted sales rate, step 730, based on experience level 735 for delay time 727. Experience level 735 is similar to experience level 435 discussed above in relation to FIG. 4. Unreported sales fraction 734 may also be used to refine the simulations in step 750. A variance may be calculated for both reported sales 738 and unreported sales 739, step 730.

Based on the variances calculated in step 730, a probability distribution may be calculated for both reported and unreported sales during the delay time, step 740. The probability distribution reflects all possible values of a retailer's sales with an indication of their probabilities. A convolution 750 of both the reported probability distribution 748 and unreported probability distribution 749 may be performed to simulation the expectation of shopping outcomes in order to present an in-stock probability 780 to the consumer based on the parameters that were used. Convolution 750 combines the probability distribution for the number of units sold during delay time 727 with the probability distribution for the unreported sales fraction 734 for the particular retailer since its ready to sell 760 data was last updated. In some embodiments a quantity parameter 770, which may be the number of units desired by the consumer, could also be used. The unreported sales probability distribution may be based, for example, on the historical accuracy of the retailer's data, along with the retailer's estimated rates of shrinkage and loss rate for a particular class of merchandise. The output of convolution 750 is a single probability distribution that combines both of these effects.

Figure 5:
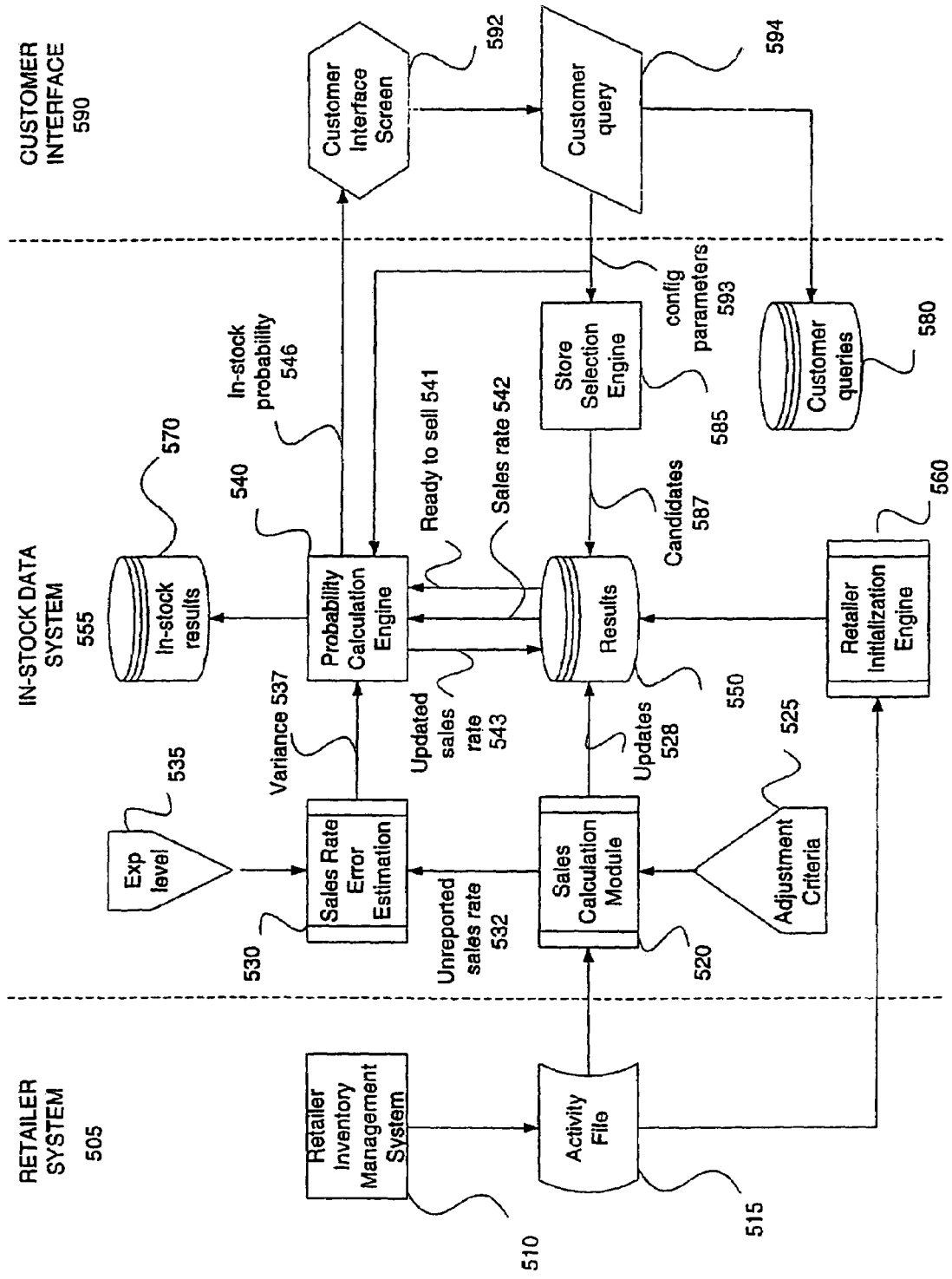
FIG. 5 is block diagram illustrating an exemplary architecture of an item availability determination system.

FIG. 5 is a block diagram illustrating an exemplary architecture of an item availability determination system according to one embodiment of the present invention. In one embodiment, an in-stock data system 555 may be used to determine the probability that a customer will find a particular product in stock at a particular store location at the time when the customer is expected to make a trip to the store to purchase the product. Although the architecture is illustrated and discussed at times in relation to a single retailer, such is only done for ease of explanation. The architecture is not meant to be limited only to a single retailer or customer but, rather, may include multiple retailers and customers. It should also be noted that the operation of the engines and/or databases of in-stock data system 555 may reside in a single or multiple engines and/or databases. In addition, some or all of the in-stock data system 555 may reside with retailer 505.

In one embodiment, in-stock data system 555 may receive data from one or more retailers (e.g., retailer inventory management system 510) that may be used to initialize calculations, block 560, for an in-stock probability analysis. The data provided to retailer initialization engine 560 may include, for examples, daily sales by product and store, retailer's calendar, daily inventory on hand by product and store, etc. Where the retail initialization data is, for example, daily sales by product and store, retail initialization engine may compute the rate of sale of a product. The results of the retailer initialization engine 560 are stored in database 550. Database 550 may store data such as reported inventory positions, rates of sale, cumulative history of observed sales at a given time (HistSales), cumulative amount of sales observation time by time (ObsTime), and seasonal profiles as discussed below.

Retailer inventory management system 510 also generates an activity file 510 that includes data based on the sales activity of a retailer's store subsequent to retailer initialization. Activity file 510 may include data such as sales, returns, shipments of products received from suppliers (e.g., distributors, manufacturers) by store and PID, and inventory reconciles. The data in activity file 510 may be transmitted to in-stock data system 555.

Customer 590 may use a customer interface screen 592 (e.g., client browser 221 of FIG. 2) to input customer configurable parameters 593 to in-stock data system 555 based on a customer query 594 (e.g., form 320 of FIG. 3). It should be noted that customer configurable parameters 593 may be received customer interface 590 through one or more intermediary systems, for example, from provider server 240 of FIG. 2.

Customer configurable parameters may include the product desired for purchase, the expected shop time, store location, and the quantity of the product desired. In one embodiment, the customer queries may be stored in a database 580.

The product and store location parameters provided by customer query 594 may be input to a store selection engine 585. The store selection engine 585 is used to select candidate stores that have the desired product based on the store location parameter and the retailer initialization results and retailer update 528 information. The candidates 587 may be stored in database 550 and/or passed to probability calculation engine 540. In one embodiment, two or more of probability calculation engine 540, store selection engine 585, and retailer initialization engine may be part of a same processing engine.

Probability calculation engine 540 calculates a probability distribution for sales for the period between the current time and the shop time. Probability calculation engine 540 may also perform a simulation on the probability distribution using the ready to sell parameter 541, sales rate 542, and a quantity parameter received from customer query 594. The probability analysis may be refined with the use of additional data. In some embodiments, the analysis may be used in conjunction with the additional data to calculate In-stock results 570 and an updated sales rate 543.

In one embodiment, the delay time between the shop time and the current time may be adjusted by a retailer update time. The retailer update time is the last time a retailer updated their inventory data. This time may add to the period of uncertainty in calculating the probability distribution.

In another embodiment, a retailer's seasonal profile information may be used to adjusted sales rate 542 ("adjusted sales rate"). The seasonal profile may include information such as seasonal promotional activity and seasonal variations in sales rate and seasonal profile for forecasted sales during the delay time (FsctProfile). The calculation discussed herein may be based various time units (e.g., hours, days, weeks, months, etc.). However, for ease of discussion the time units are in days unless otherwise specified. As such, seasonal profile variations may be captured by a seasonal profile vector containing 365 entries, one fore each day of the year. Retailers typically define their seasonal calendars so that the first week of the selling season always begins on the same day of the week. Thus Day 1 in the seasonal profile corresponds to the same day of the week each year. For example, it often starts after the Christmas season at the end of February. The seasonal numbers may determined by taking the sums of sales across all stores and possibly all products in a class for each day in the historical data. The sums are then normalized so that their average is 1 across the year.

A sales rate error estimation 530 may also be performed based on information received from retailer activity file 515. In one embodiment, the unreported sales rate fraction (UnreportedFraction) 532 may be used to adjust the sales rate. A single number may be used as a default for all time. The number may be estimated for each retailer by sales calculation module 520 and may differ by store and/or product. An adjustment criteria 525 such as an adjusted seasonal profile associated for a product and store may also be used in calculating the sales rate. With these parameters, the sales rate for a particular product and store may be calculated as follows:

Sales Rate=$FcstProfile(t)*HistSales(t)/ObsTime(t)$
$*DayParts(1-UnreportedFraction(t))$;

where t=an absolute measure of time in days, e.g., the number of days since the beginning of system operation or the date expressed in days.

$FcstProfile(t)=(SUM OF AdjProfile(T) for T=t-$
$Time1 to t+Time2)/(1+Time1+Time2)$;

Time1=OnHandUpDate/DayParts;

Time2=DelayTime/DayParts;

where OnHandUpDate is the number of DayParts that have elapsed since the ready to sell 541 figure was last updated and DayParts is the number of parts that a day is divided into for customer 590 (e.g., the default may be 3, meaning that the day is divided into 3 equal parts). In an alternative embodiment, sales calculation module 520 may reside on retailer inventory management system 510.

In one embodiment, an experience level 535 may be used to calculate a statistical variance 537 of the sales rate. Experience level 535 may be measured statistically by the number of time units of observation for the sales of a particular product. Experience level 535 may be a subjectively assessed level of reliability of a retailer's 505 data. For the purposes of model calibration for a specific retailer, experience level 535 may be treated as a discrete variable with three values: HIGH, MEDIUM or LOW. For a negative binomial distribution, a HIGH value has the effect of assuming that sales are Poisson arrivals with a known arrival rate (i.e., there is still uncertainty regarding future sales). If retailer's 505 data is much less reliable, a LOW rating adds considerably more variance to the probability distribution. Negative binomial distributions are known in the art, for example, as discussed in "Discrete Distributions," by N. Johnson and S. Kotz, Houghton Mifflin Company, 1969. In an alternative embodiment, other distributions may be used, for example, a normal distribution. A variance may be calculated for both reported sales rate 542 and unreported sales rate 532.

In one embodiment, in which the probability of sales during the delay time is of the negative binomial type, the negative binomial distribution may depend upon two variables: P and g. These variables are related to the mean and variance as follows:

$$Mean = g(1-P)/P \text{ and } Variance = Mean/P.$$

For example, if the mean and variance for the negative binomial are known, then P and g may be determined from the formulas:

$$P = Mean/Variance; \quad g = Mean*P/(1-P).$$

For any particular values of P and g, one can calculate N values of the negative binomial distribution: {ProbVector (I|P,g), for I=1 To N}. The calculation may be performed recursively using the following formulas:

Let $ProbVector(1|P,g) = p \wedge g$.

Then for I=1 To N, let $$ProbVector(I+1|P,g) = ProbVector(I|P,g)*(1-P)*(g+I-1)/I.$$

For the in-stock probability calculation, two separate negative binomial distributions are calculated. Their parameters are determined in the following way.

Let us consider the following example numbers:

DayParts=3=number of parts used to divide up the retailer's sales during a day, e.g., 3 parts such as morning, afternoon and evening.

LastUpdateTime=10 days ago=the time at which the retailers data was last updated.

Then let:

$$TT = DayParts*LastUpdateTime.$$

We assign constant values that denote possible choice for the retailer's level of experience as follows:

NU=50, TIMEH=1000, TIMEM=100, TIMEL=10

The TIMEH, TIMEM and TIMEL values are combined with the retailer's experience level to determine a parameter called TIME. For example, if there are 3 discrete levels for experience level, this could be done as follows:

If ExperienceLevel=HIGH Then TIME=TIMEH
ElseIf ExperienceLevel=MEDIUM Then TIME=TIMEM
ElseIf ExperienceLevel=LOW Then TIME=TIMEL Using the value for TIME, and a given sales rate per day part called SalesRate, the parameters for two negative binomial distributions ProbVectorR and ProbVectorU may be determined as follows:

$$TauU = TIME*DayParts$$

$$TauR = TIME*DayParts$$

$$GammaR = SalesRate*TauR$$

$$GammaU = UnreportedFraction*SalesRate*TauU$$

$$Pu = TauU/(TT+TauU)$$

$$Pr = TauR/(TauR+DelayTime)$$

Then ProbVectorR(I|P=Pr, g=GammaR), which is the negative binomial distribution for the reported sales during time DelayTime, is determined by the recursive calculation.

Similarly, ProbVectorU(I|P=Pu, g=GammaU), which is the negative binomial distribution for unreported sales during TT, is determined by the recursive calculation.

Given a particular number of units on hand, called ReadytoSell, the in-stock probability (InStockProb) may then be determined by a convolution of these two negative binomial probability distributions. There are KK=ReadytoSell calculated values, which are denoted {Convolution(J), for J=1 To KK}. They are calculated as follows:

First, initialize as follows:

Convolution(J)=0 for all J.

For J=1 To KK, perform the following recursive calculation of the convolution values:

For I=1 To KK−J+1

$$Convolution(J) = Convolution(J) + ProbVectorU(I) * ProbVectorR(KK-J-I+2)$$

Then, the in-stock probability may be determined by summing the convolutions:

InStockProb=the sum of the KK values {Convolution(J), for J=1 To KK}.

As such, an in-stock probability 546 may be determined by probability calculation engine 540 with a statistical calculation that may depend on one or more inputs such as experience level 535, sales rate 542, delay time, and ready to sell 541. In one embodiment, in-stock probability 546 may be determined by a compiled subroutine. In alternative embodiments, in-stock probability 546 may be determined by other means, for example, stored as a multi-dimension array and determined by a table lookup.

The in-stock probability 546 may then be presented using customer 590 via customer interface screen 592. As previously mentioned, in-stock probability 546 may be presented using customer 590 in various ways, for examples, as a percentage, as an absolute indicator (e.g., in-stock, out-of-stock, call store), and a confidence descriptor (e.g., high, medium, and low). Moreover, various customer interface screens 592 may be used to present in-stock probability 546 using customer interface 590, for examples, visual and audio.

An example of in-stock probability 546 calculation for a particular store and, product is presented based on the following parameters. Assume DayParts=3; ExperienceLevel=LOW; ShopTime=4; OnHandUpdate=3;

AdjProfile(Function)=0.8, 1, 1, 1.1; UnreportedFraction=0.1; ReadytoSell=3; HistSales=10; and ObsTime=50. Then, DelayTime(Store)=ShopTime+OnHandUpdate=4+3=7

Time1=$INT$(OnHandUpDate/DayParts)=$INT$(3/3)=1

Time2=$INT$(DelayTime/DayParts)=$INT$(7/3)=2

FcstProfile(t)=(SUM OF AdjProfile(T) FOR T=t−Time1 TO t+Time2)/(1+Time1+Time2)=(0.8+1+1+1.1)/(1+2+1)=0.975

SalesRate=FcstProfile(t)*HistSales(t)/(ObsTime(t)
*DayParts*(1□UnreportedFraction(t))
=0.975*10/(50*3*(1−0.1))=0.07222.

The constants are NU=50; TIMEH=1000, TIMEM=100, and TIMEL=10. The parameters are calculated to be:

Time=RimeL

TauR=Time*DayParts=30

TR=DelayTime=7

GammaR=SalesRate*TauR=2.167

The values are TauU=Time*DayParts=30; TT=DayParts*LastUpdateTime=30;

GammaU=UnreportedFraction*SalesRate*TauU=0.2167

Pu=TauU/(TT+TauU)=30/(30+30)=0.5

Pr=TauR/(TauR+DelayTime)=30/(30+7)=0.81081.

KK=ReadyToSell=3

InStockProb=0.9388. As such, for this example, the in-stock probability 546 may be presented to customer 590 as 94%.

Figure 6:
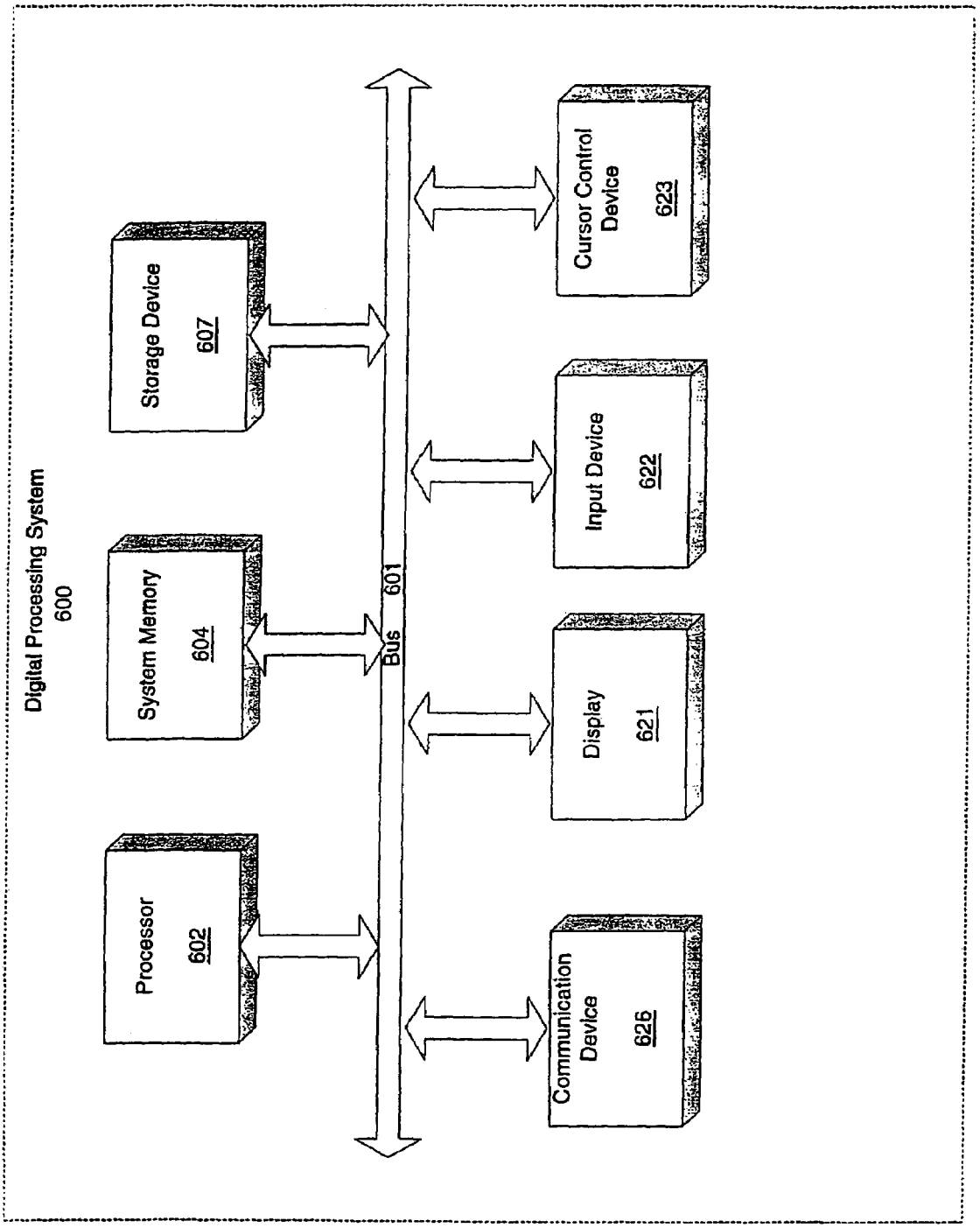
FIG. 6 illustrates one embodiment of a computer system in the form of a digital processing system.

FIG. 6 illustrates one embodiment of a computer system (e.g., a client or a server) in the form of a digital processing system representing an exemplary server, workstation, personal computer, laptop computer, handheld computer, personal digital assistant (PDA), wireless phone, television set-top box, etc., in which features of the present invention may be implemented. Data system 555 of FIG. 5 may be implemented within digital processing system 600.

Digital processing system 600 includes a bus or other means 601 for transferring data among components of digital processing system 600. Digital processing system 600 also includes processing means such as processor 602 coupled with bus 601 for processing information. Processor 602 may represent one or more general purpose processors (e.g., a Motorola PowerPC processor and an Intel Pentium processor) or special purpose processor such as a digital signal processor (DSP)(e.g., a Texas Instrument DSP). Processor 602 may be configured to execute the instructions for performing the operations and steps discussed herein. For example, processor 602 may be configured to process algorithms to determine an in-stock probability of a product at a store location.

Digital processing system 600 further includes system memory 604 that may include a random access memory (RAM), or other dynamic storage device, coupled to bus 601 for storing information and instructions to be executed by processor 602. System memory 604 also may be used for storing temporary variables or other intermediate information during execution of instructions by processor 602.

System memory 604 may also include a read only memory (ROM) and/or other static storage device coupled to bus 601 for storing static information and instructions for processor 602.

A storage device 607 represents one or more storage devices (e.g., a magnetic disk drive or optical disc drive) coupled to bus 601 for storing information and instructions. Storage device 607 may be used for storing instructions for performing the steps discussed herein. The data storage device 607 may also be as the databases discussed herein (e.g., database 550 of FIG. 5).

In one embodiment, digital processing system 600 may also be coupled via bus 601 to a display device 621, such as a cathode ray tube (CRT) or Liquid Crystal Display (LCD), for displaying information to the user. For example, graphical and/or textual depictions such as a data input form and an in-stock probability meter. Typically, an alphanumeric input device 622, including alphanumeric and other keys, may be coupled to bus 601 for communicating information and/or command selections to processor 602. Another type of user input device is cursor control 623, such as a mouse, a trackball, or cursor direction keys for communicating direction information and command selections to processor 602 and for controlling cursor movement on display 621.

A communications device 626 (e.g., a modem or a network interface card) may also be coupled to bus 601. For example, the communications device 626 may be an Ethernet card, token ring card, or other types of interfaces for providing a communication link to a network (e.g., network 110 of FIG. 1) for which digital processing system 600 is establishing a connection.

It will be appreciated that the digital processing system 600 represents only one example of a system, which may have many different configurations and architectures, and which may be employed with the present invention. For example, some systems often have multiple buses, such as a peripheral bus, a dedicated cache bus, etc.

The method and apparatus discussed herein may enable retailers having "brick & mortar" stores (e.g., WalMart and GoodGuys) to serve more real-time data on store-level product availability information to sites (e.g., Yahoo, AOL) on a network. In addition, retailers may perform product marketing to consumers by tailoring unique offers for products that are in-stock in specific stores, even at specific times of the day. For example, a retailer may be able to provide a consumer the information that a certain number of a particular model camera are in-stock at a specific store and are available for a discounted price during a specified time period.

Moreover, the information output to a client computer may be in a widely adapted format, such as XML data packets, that may be accessed in a variety of manners, for examples, served to a desk or laptop computer wired to a network, via a call center, over wireless devices, and even in-store displays.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A machine readable medium with stored instructions, which when executed by a processor perform steps in a method comprising:

calculating a first variance for a reported sales rate of an item, wherein calculation of the first variance includes a parameter to account for inventory deliveries until an expected time of transaction;

calculating a second variance for an unreported sales rate of the item;

generating a first probability distribution for reported sales, during a delay time, of the item;

generating a second probability distribution for unreported sales of the item based on an update time of a ready to sell parameter; and performing a convolution of the first and second probability distributions to obtain a probability of an availability of the item at an expected time of transaction.

2. The machine readable medium of claim 1, wherein the parameter to account for inventory deliveries until an expected time of transaction is based on inventory deliveries to a physical retail selling location.

3. A machine readable medium having stored thereon instructions, which when executed by a processor, cause the professor to perform the following:

calculating a first varience for a reported sales rate of an item;

calculating a second varience for a unreported sales rate of the item;

generating a first probability distribution for reported sales, during a delay time, of the item;

generating a second probability distribution for unreported sales of the item based on an update time of a ready to sell parameter;

performing a convolution of the first and second probability distributions to obtain a probability of an availability of the item at an expected time of transaction; and adjusting pricing, or a contractual term related to the sale of an item based on the probability of the item's availability at the expected time of transaction.

\* \* \* \* \*